Nov. 1, 1960 V. M. SANDERS 2,958,184
JET PROPULSION MOTOR WITH SAFETY PRESSURE RELIEF MEANS
Filed Oct. 17, 1950 2 Sheets-Sheet 1
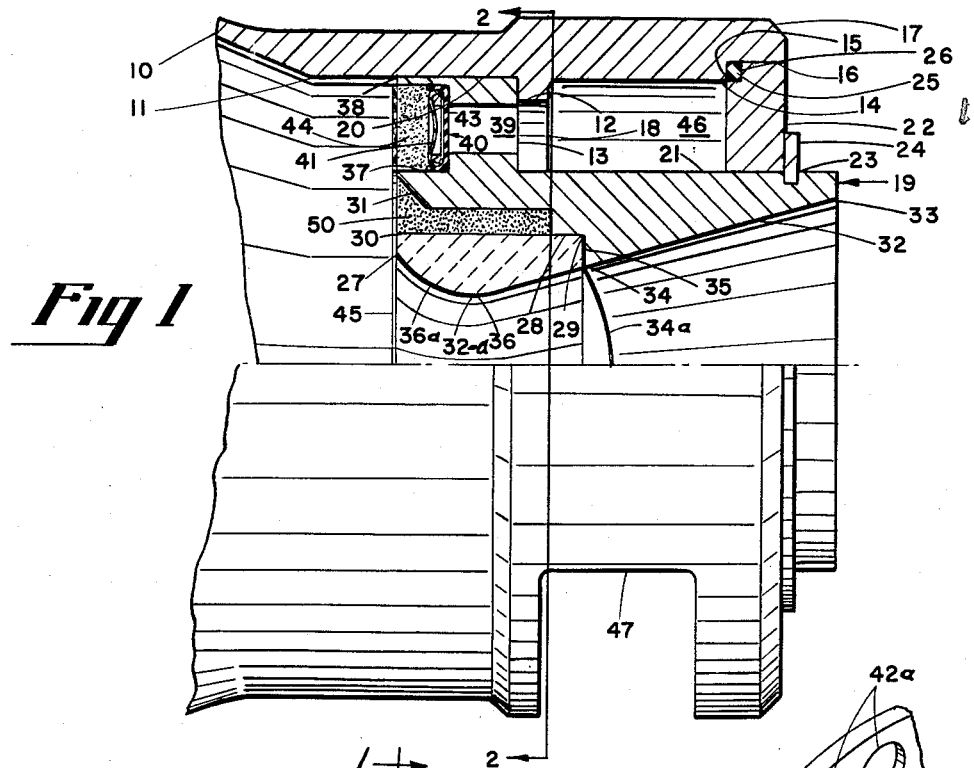
Fig 1
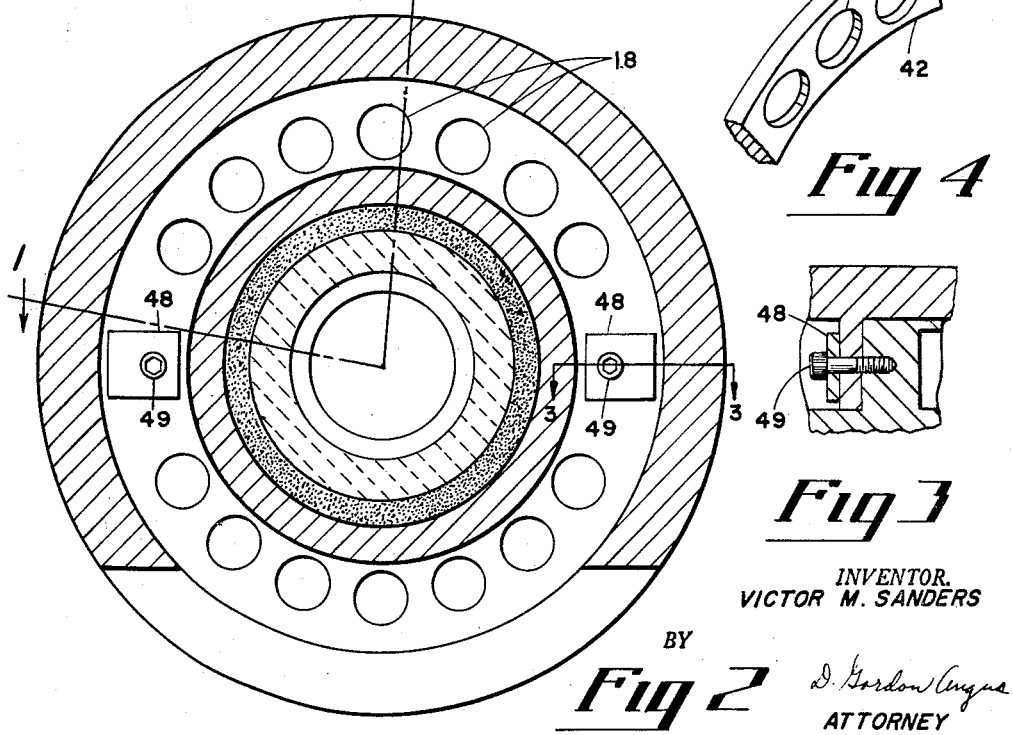
Fig 2
Fig 4
Fig 3
INVENTOR.
VICTOR M. SANDERS
BY
D. Gordon Angus
ATTORNEY INVENTOR.
VICTOR M. SANDERS
BY D. Gordon Angus
ATTORNEY

United States Patent Office 2,958,184
Patented Nov. 1, 1960

2,958,184

JET PROPULSION MOTOR WITH SAFETY PRESSURE RELIEF MEANS

Victor M. Sanders, Azusa, Calif., assignor, by mesne assignments, to Aerojet-General Corporation, Azusa, Calif.

Filed Oct. 17, 1950, Ser. No. 190,485

13 Claims. (Cl. 60—35.6)

This invention relates to jet propulsion and particularly to jet propulsion motors employing a solid propellant charge in a combustion chamber provided with an exhaust nozzle through which the products of combustion are ejected.

The object of this invention is to provide a safety device for relieving the pressures in the chamber whenever the pressure becomes dangerously high.

A solid propellant thrust motor commonly comprises a combustion chamber which may be filled or nearly filled with a solid propellant substance, which upon being ignited burns rapidly to produce large volumes of gas. The gases so generated are ejected at high velocity through a restricted exhaust nozzle to produce thrust.

Since the passageway through the nozzle is relatively small compared to the size of the combustion chamber and the volume of gases generated by the combustion is large, high pressures are sometimes generated in the combustion chamber which approach or reach explosion pressure. Under such conditions it is desirable that the motor be provided with a safety device for quickly relieving high pressures and thereby avoid explosions.

In accordance with my invention, I have provided a safety device for relieving dangerously high pressures developed in a solid propellant motor. The safety device essentially comprises a multiple port relief member, which adjoins the nozzle proper and is normally kept closed by a suitable diaphragm. Whenever the pressure in the chamber exceeds the bursting strength of the diaphragm material, the diaphragm will rupture and relieve the pressure in the combustion chamber through a plurality of ports.

A feature of my invention is the use of a single annular diaphragm which may be ruptured at a number of points to allow the high pressure in the combustion chamber to escape rapidly.

The foregoing and other features of my invention will be better understood from the following detailed description and accompanying drawings in which:

Fig. 1 shows a side view partially in cross section of a portion of a thrust motor provided with a nozzle and a safety diaphragm, in accordance with this invention;

Fig. 2 is a cross section view taken on the line 2—2 of Fig. 1;

Fig. 3 is a cross section view taken on the line 3—3 of Fig. 2;

Fig. 4 is an isometric view of a portion of a backing up ring used in the construction.

Figure 5:
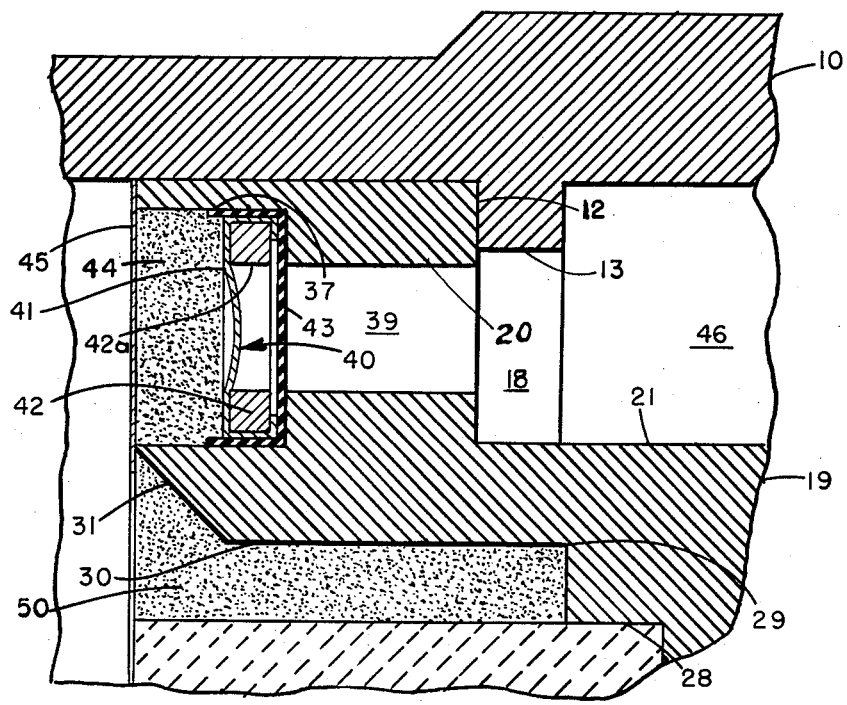
Fig. 5 is an enlarged partial view in cross-section showing details of the construction in Fig. 1.

Referring to Fig. 1 there is shown the rearward or nozzle end of a thrust motor chamber 10, the wall of which is shown reducing to a relatively small diameter up to a position 11 on the drawing at which point the chamber becomes substantially cylindrical toward the rear. The cylindrical chamber continues to a shoulder 12 formed by an annulus 13, which is preferably an integral portion of the wall of the chamber 10. Annulus 13 is preferably thinner than the chamber wall.

Downstream from the annulus 13 the inner diameter of the chamber continues cylindrical to a position 14 at substantially the same diameter as upstream from the annulus 13. However, near the rear end of the chamber the cylindrical portion is counterbored forming a shoulder 15 and a counterbore 16 which continues at uniform diameter to the rear end 17 of the chamber. The outer diameter of the chamber, immediately surrounding the annulus 13 and continuing to the rear end of the chamber proper is preferably of larger diameter than forward of the annulus.

There is set into the rear end of the chamber, a nozzle member 19 having a cylindrical portion 20 of a diameter corresponding to the inner diameter of the chamber at position 11, and a smaller cylindrical portion 21. The larger portion 20 of the nozzle member is preferably shorter in length than the distance between position 11 and shoulder 12 against which the portion 20 abuts. The smaller cylindrical portion 21 of nozzle member 19 continues at uniform diameter from shoulder 12 to a point beyond the end 17 of chamber 10. This rearward end of the nozzle 19 is centered and supported by means of an annulus 22 which has its inner diameter proportioned to fit snugly around the small cylindrical portion 21 of nozzle 19 and has its outer diameter corresponding to the diameter of the counterbore 16. The thickness of annulus 22 preferably corresponds to the length of counterbore 16. At a position corresponding to the rearward end of chamber 10, cylindrical portion 21 of nozzle 19 is provided with a groove 23 which continues rearwardly for any desired distance short of the end of the nozzle. A snap ring 24 slides into the groove 23 and when in place rests against annulus 22 thereby locking it in place. An O-ring 25 may be employed in a step shaped groove 26 cut into the outer and forward edge of annulus 22. The O-ring thus seats between the annulus 22 and the shoulder 15 formed by counterbore 16.

The forward end of nozzle member 19 is provided with an axial bore 28 which extends rearwardly to a position 29; and an axial counterbore 30 of larger diameter than bore 28 extends forwardly of bore 28, the forward edge of counterbore 30 preferably being provided with a chamfer 31.

The reward cylindrical portion 21 of the nozzle member 19 is provided with an axial substantially frusto conical bore 32 which has its largest diameter at the rearward end 33 of the cylindrical portion and merges into the end of axial bore 28. The small diameter 34 of frusto conical bore 32 should be less than the diameter of the bore 28 thereby forming a shoulder 35.

A cylindrical piece of refractory material 32–a, such as, for example, graphitic carbon, is proportioned to fit snugly into bore 28 and extend between the shoulder 35 and the forward end 27 of the cylindrical portion 20 of the nozzle. The frusto conical bore 32 is continued through the carbon or refractory material 32–a, until the throat diameter 36 is reached. At this point of smallest cross section, the bore enlarges as the bore progresses toward the forward end, preferably in the form of a streamlined surface 36a which is curved in cross section as shown in Fig. 1. Frusto conical bore 32, throat 36 and the enlarging surface 36a form a nozzle of the De Laval type through which the gases are efficiently exhausted.

A suitable refractory material, such as, for example, a refractory cement 50, capable of insulating the metal portion of the nozzle member 19 from the heat passing through the carbon insert 32–a, is packed into the space between the counterbore 30 and the carbon insert 32–a.

This cement hardens and helps to hold the carbon insert in place as well as to act as a heat insulator.

The forward end of cylindrical portion 20 of nozzle member 19 is provided with an annular groove 37. The groove 37 starts near but not at the outer periphery 38 of the nozzle member and extends for a substantial distance into the cylindrical portion 20. The width of the groove should be such that it does not go beyond chamfer 31.

A plurality of holes 39 are drilled at spaced intervals parallel to the longitudinal axis of the nozzle from the groove 37 through to the rearward face of cylindrical portion 20, and communicating with space 18 between annulus 13 and the cylindrical portion 21 of nozzle 19.

Within groove 37 there is located a safety diaphragm 40, comprising a thin metal annulus 41, wider than groove 37, placed on a backing-up ring 42 provided with holes 42a corresponding in number and position to holes 39. The overlapping edges of annulus 41 are bent around the backing up ring 42 forming in effect a U-shaped cross section. The bottom of groove 37 is covered with a thin annular gasket 43 of plastic material, such as, for example, neoprene rubber, which is preferably wider than the width of the groove 37. The metal annulus and backing-up ring are then seated in groove 37 with the metal annulus away from the neoprene gasket which covers holes 39, the backing-up ring coming in contact with the plastic annulus. The remainder of groove 37, ahead of diaphragm 41, is filled with a suitable heat insulating material 44, such as, for example, zinc chromate paste. A paper annulus 45 may be placed over the forward end of the groove 37 to prevent the insulating material 44 from falling out of the groove and into the chamber 10.

The frusto conical bore 32 is normally sealed when not in operation by a metal disc 34a which fits snugly into the bore 28 and rests between shoulder 35 and the rearward end of carbon insert 32a.

The region between annulus 13 and annulus 22 forms an annular expansion chamber 46; and slot 47 is provided in the wall of chamber 10 at a position to communicate with annular expansion chamber 46. Any gases escaping through holes 39 and space 18 thus rush into the annular expansion chamber 46 and are instantly exhausted through the opening 47.

Fig. 3 is a detail in cross section showing a way in which the nozzle may be assembled and held in place in the chamber even though the forward annulus 22 is not in position. A pair of clips 48 are located at the horizontal diameter of the annulus 13. These clips are held in place by bolts 49 which pass through clips 48 and into large cylindrical portion 20 of the nozzle, thereby bolting the nozzle 19 to the chamber 10 in a fixed position.

The device can be assembled and operated as follows: The nozzle 19 is introduced into the rearward end of the chamber until the large cylindrical portion 20 comes to rest against the annulus 13, and the holes 39 are aligned with space 18. Annulus 22 is slipped over the small cylindrical portion 21 of nozzle 19 and seated in the counterbore 26, and snap ring 24 is inserted in groove 23 thereby holding the nozzle and chamber securely together.

Pressure developed within the chamber will escape through the central orifice and throat 32. If the pressure in the chamber should exceed the bursting strength of the diaphragm, the pressure will act through the loosely packed paste 44 against the surface of the diaphragm causing the diaphragm to shear through the holes 42a in the backing up ring 42. As soon as the diaphragm gives, the plastic covering over the ports 39 will be broken and the gases will ecape through the openings 39 and corresponding openings 18 into the annular expansion chamber 46, from which they will escape through the milled slot 47. Customarily, the diaphragm will rupture at a plurality of points thereby providing ample passageway for the gases under pressure.

The surface of the backing-up ring that comes in contact with the metal diaphragm is preferably finished flat to provide sharpness for the edge of each hole. This will enable the diaphragm to shear more cleanly.

An advantage of my device is that it provides no outside interference such as is commonly occasioned by the use of safety diaphragms, yet it offers more adequate protection against excessive pressure that the usual single disc type of diaphragm since the total area of the combined holes 39 is far greater than what can be obtained by using a single shield diaphragm of the customary type.

Another advantage of my safety diaphragm is that all of the metal portions, which are ejected when the diaphragm bursts, are forced into the expansion chamber 46 and either remain in the annular expansion chamber 46 or are discharged at right angles through opening 47, thereby avoiding striking any operators, or equipment which happens to be located downstream from the rocket motor.

A further advantage of my invention is that the diaphragm can be placed at the extreme rearward end of the reaction motor thereby keeping the hot exhaust gases within a concentrated area. This would not be possible with the conventional burst diaphragm designs.

Another advantage is that the diaphragm ruptures in a step-wise manner thereby reducing the shock load on the unit such as is encountered when all of the diaphragms burst at one time. The rupture sequence continues only as long as the chamber pressure increases and stops whenever the chamber pressure levels off, therefore, the nozzle is able to function efficiently during the entire operation of the rocket, even though the diaphragm has partially burst.

I claim:

1. A jet propulsion motor comprising a combustion chamber provided at its rearward end with an exhaust opening, that portion of the chamber adjoining said opening being substantially cylindrical, a fixed annulus within said cylindrical portion located a substantial distance from said rearward end, a nozzle member comprising a first portion proportioned to fit in said cylindrical portion of said combustion chamber adjoining the upstream side of said annulus and a second cylindrical portion smaller than said first portion, proportioned to fit within said fixed annulus, opening means providing communication from one side to the other of said fixed annulus, said nozzle member being provided with a streamlined exhaust orifice, removable annular means for supporting said second cylindrical portion of said nozzle located at the end of said chamber, locking means for holding said nozzle and said removable annular means in fixed relationship to said combustion chamber, an annular groove in the forward surface of said first portion of said nozzle commencing near the outer edge of said surface, said groove extending a substantial distance longitudinally into said first portion, a plurality of holes extending from the bottom of said groove longitudinally through said first portion, said holes communicating with said open means, an expansion chamber formed by said fixed annulus, chamber wall, removable annular means and second cylindrical portion of said nozzle, venting means from said expansion chamber, and an annular diaphragm within said groove for sealing said holes in said first portion.

2. A jet propulsion motor according to claim 1 in which said diaphragm comprises a thin sheet of metal mounted on a backing-up ring provided with a plurality of holes, said holes in said backing-up ring corresponding to the holes in said first portion.

3. A jet propulsion motor according to claim 2 in which the bottom of said groove is lined with an annulus of plastic material.

4. A jet propulsion motor according to claim 3 in which the plastic material lining said groove is neoprene.

5. A jet propulsion motor according to claim 2 in which the surface of said backing-up ring in contact with said diaphragm is made flat to provide maximum sharpness at the edges of said hole in said backing-up ring.

6. In a jet propulsion motor of the type comprising a combustion chamber and an exhaust nozzle leading from the combustion chamber, means for relieving excessive pressure within the chamber comprising an annular groove surrounding the nozzle in communication with the chamber, a plurality of openings through the annular groove to the atmosphere and a frangible diaphragm within said groove, covering the openings, whereby excessive pressure within the chamber operates to rupture the diaphragm at said holes to relieve the pressure.

7. Apparatus according to claim 6 in which the diaphragm is an annular ring of frangible material which fits within said groove.

8. Apparatus according to claim 7 in which plastic material is located within said groove between the diaphragm and the chamber.

9. In a jet propulsion motor of the type comprising a combustion chamber and an exhaust nozzle leading from the combustion chamber, means for relieving excessive pressure within the chamber, said means comprising an annular groove surrounding the nozzle in communication with the chamber, opening means through the annular groove to the atmosphere, an annular backing-up ring within the groove and provided with a plurality of spaced holes registering with said opening means, a frangible annulus situated in front of the backing-up ring and covering said holes, whereby excessive pressure within the chamber ruptures the annulus at at least one of said holes.

10. Apparatus according to claim 9 in which the edges of the frangible annulus overlap the backing-up ring and are bent around the backing-up ring.

11. Apparatus according to claim 9 in which an annular plastic gasket is located in the groove between the backing-up ring and the opening means.

12. Apparatus according to claim 9 in which the groove in front of the frangible annulus contains heat insulating material.

13. In a jet propulsion motor of the type comprising a combustion chamber and an exhaust nozzle leading from the combustion chamber, means for relieving excessive pressure within the chamber comprising an annular groove surrounding the nozzle in communication with the chamber, a plurality of openings through the annular groove to the atmosphere, a frangible diaphragm within said groove, covering the openings, whereby excessive pressure within the chamber operates to rupture the diaphragm at said holes to relieve the pressure, and an expansion chamber placed in communication with the holes at the side of the diaphragm outside of the chamber.

References Cited in the file of this patent

UNITED STATES PATENTS

| | | |
|---|---|---|
| 2,481,059 | Africano | Sept. 6, 1949 |
| 2,515,049 | Lauritsen et al. | July 11, 1950 |